Dec. 23, 1941.   W. A. RAY   2,267,216
CONTROL SYSTEM
Original Filed Jan. 21, 1937
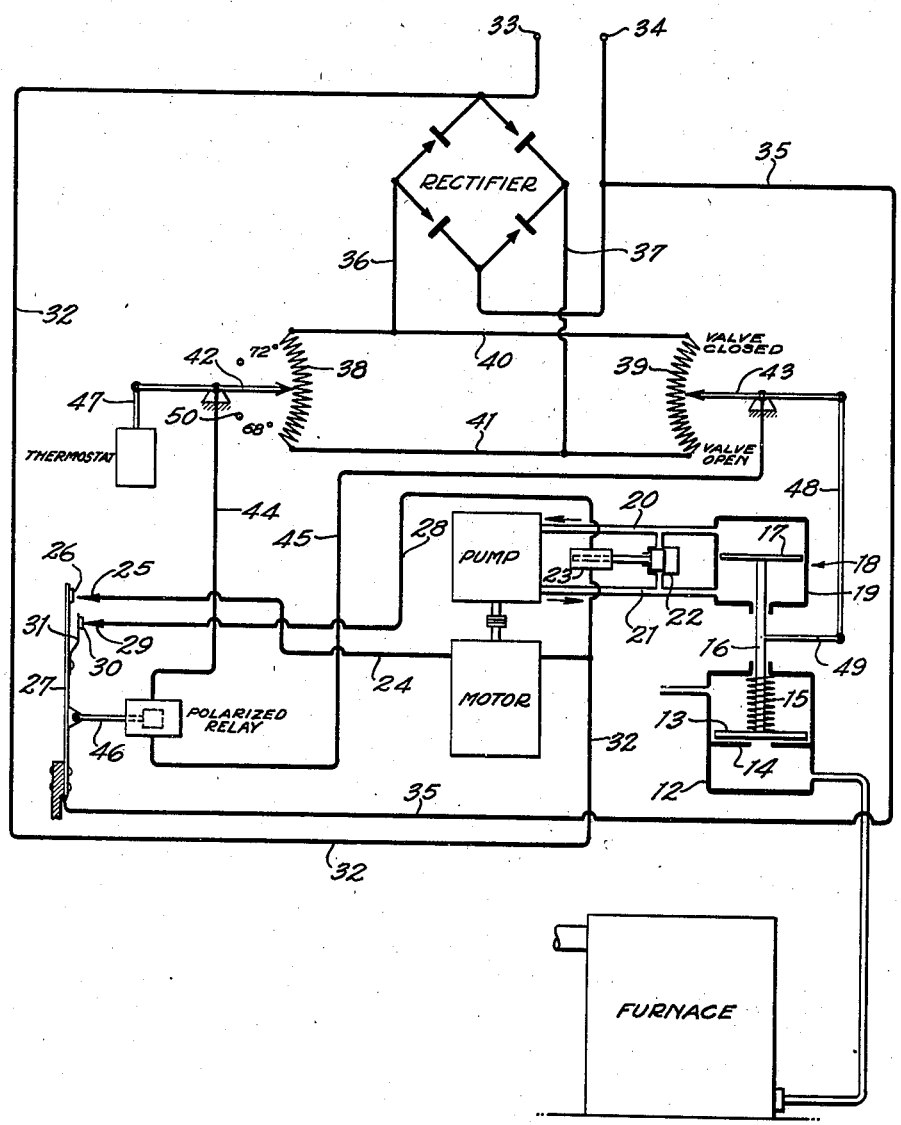
WILLIAM A. RAY,
INVENTOR.
BY John H. Rouse,
ATTORNEY Patented Dec. 23, 1941

2,267,216

UNITED STATES PATENT OFFICE 2,267,216

CONTROL SYSTEM

William A. Ray, Glendale, Calif.

Original application January 21, 1937, Serial No. 121,575. Divided and this application June 25, 1940, Serial No. 342,334

7 Claims. (Cl. 236—74)

My present invention relates to condition control systems, and particularly to a modulating system wherein a member, movable to a plurality of positions for variably controlling a condition, such as temperature, pressure, or the like, is positioned in accordance with the existing variation of the condition from a predetermined value.

It is an object of this invention to provide means for accurately so positioning a condition-controlling member when the means employed for moving the member is in the form of a liquid-pressure operated motor. Such a motor comprises a chamber provided with a movable wall or partition (as a piston, bellows, or diaphragm) which is biased in one direction of movement and is movable in the opposite direction against the bias by the pressure of liquid pumped into the chamber. Movement of the partition under the influence of the bias is effected by opening a relief valve, connected to the pressure chamber, to reduce the liquid pressure therein.

It is a further object to provide simple, dependable and effective means, including switching means actuated in response to change in the condition of an electrical bridge, for accomplishing the above-stated object.

Other objects and advantages of my invention will be found in the description, the drawing, and the appended claims.

This application is a division of my copending application, Serial No. 121,575, filed January 21, 1937.

For complete understanding of the invention, reference may be had to the following detailed description and accompanying drawing, wherein the single figure is a diagrammatic view of a heating control system embodying my present invention.

In the drawing, indicated by the legend is a gas-consuming furnace, fuel supply to which is controlled by a modulating valve 12, which comprises a valve member 13 cooperable with a valve seat 14 and biased theretoward by a compression spring 15. The stem 16 of the valve member is connected at its upper end to the piston 17 of a liquid-pressure operated motor 18 which comprises a cylinder 19, the upper and lower ends of which are respectively connected by pipes 20 and 21 to a liquid pump, driven by an electric motor, both of these devices being indicated by legends. The pump may be of any conventional type adapted to circulate, only in the direction of the arrows, the liquid (preferably, oil) with which the areas above and below the piston 17 are filled.

The pipes 20 and 21 are interconnected by a normally-open relief valve 22 operated by a solenoid 23. Upon energization of this solenoid, the relief valve closes and, if the pump motor is then also energized, the piston is forced upward by the liquid. If the pump is then stopped, the piston remains in its elevated position as the liquid cannot flow in the opposite direction through the pump, nor through the closed relief valve. If, however, the solenoid is now de-energized, the piston moves downward under the influence of spring 15, the liquid passing from the area below the piston to the area above it through the open relief valve.

One lead of the pump motor is connected by a wire 24 to a fixed contact 25 with which a contact 26, carried by a switch blade 27, cooperates. The upper lead of the relief-valve solenoid 23 is connected by a wire 28 to another fixed contact 29, cooperable with a contact 30 carried by a flexible metal strip 31, secured to the switch blade. The other lead of the pump motor and of the relief-valve solenoid are connected together and, by a wire 32, to the terminal 33 of terminals 33 and 34 provided for the connection of a source of alternating current; the other power terminal 34 being connected by a wire 35 to the switch blade 27. It will thus be seen that when the switch blade is moved (by means to be described hereinafter) in one direction so that both pairs of contacts 25—26 and 29—30 are in engagement, with strip 31 inwardly flexed, the valve member will be raised; if the blade is moved in the opposite direction so that both pairs of contacts are disengaged, the valve member will fall; and if the blade is permitted to assume its normal intermediate position (as shown) with contacts 29—30 only engaged, the valve will be maintained in the condition in which it was when this occurred.

Indicated by the legend, and connected to the alternating current supply terminals 33 and 34, is a rectifier of the dry-plate type. The direct current output of this rectifier is connected by wires 36 and 37 to supply an electrical bridge, of the Wheatstone type, comprising a pair of resistances 38 and 39 interconnected by wires 40 and 41. As is well known, when points on the resistances, of equipotential, are interconnected, no current will flow through the connection. However, if the points are at different potentials, current will flow in the connection in a direction determined by the respective polarity of the points. Cooperable with the resistances 38 and 39, respectively, are pivoted contact arms 42 and 43 which are connected by wires 44 and 45 to a polarized relay, indicated by the legend, the movable element of which is connected by an arm 46 to the switch blade 27. When the relay is unenergized, the blade is in its normal position as shown. When the contact arm 42 is at a point on resistance 38 lower than that of arm 43 on resistance 39, current flows through the relay in such direction as to move the switch blade to the right; when arm 42 is higher than arm 43, the blade is moved to the left. While, for the sake of clarity, a direct current bridge system is disclosed, a similar system of the alternating current type may preferably be employed.

Provided for actuation of contact arm 42, by means of a link 47, are means movable in response to change in a condition which, in the heating system illustration of my invention, may comprise a thermostat, indicated by the legend, located in a space heated by the furnace. The other contact arm 43 is connected by a pivoted link 48 to an arm 49 extending from the valve stem 16 and thus is moved thereby along the resistance 39 between the positions, indicated by the legends, corresponding to the valve condition.

The operation of the control system will now be described. Assuming that heating is discontinued at night and that, when the system is put into operation in the morning, the temperature of the space is considerably below that for which the thermostat is set, the arm 42 will be in engagement with the lower stop pin 50, the thermostat being so arranged as to move the contact arm to correspond with the temperature values shown at either end of resistance 38. The electrical power having been interrupted at night, the other contact arm 43 will be in its upper, or "valve closed," position. Current will therefore flow through the relay in such a direction as to close both pairs of contacts 25—26 and 29—30 with the result that the fuel valve is promptly opened to its full extent. Arm 43, in the opening movement of the valve, having been brought to its lowermost, or "valve open," position, the contact arms are at points of the bridge of equipotential and the relay therefore deenergized. Relief valve 22 is thus closed and the fuel valve is maintained in its elevated position.

As the temperature of the space now rises, when it is slightly above 68°, the bridge will be sufficiently unbalanced to effect movement of the relay tending to close the fuel valve. But when, by this movement, arm 43 is brought to a position substantially corresponding to that of the thermostat-controlled arm, downward movement of the fuel valve member will be halted by deenergization of the relay. If the space temperature continues to rise, this operation will be repeated. Due to the inertia of switch blade 27 and to the relative spacing of the pairs of switch contacts, there may always be a difference between the relative positions of the contact arms on the bridge, but this difference will be quite small if the switch blade is of sufficiently flexible material and the sequential switch contacts closely arranged.

With the fuel valve now partly closed, the space heating rate is reduced. If this rate is not sufficient to compensate for the heat losses in the space, the temperature falls, effecting unbalance of the bridge in such a direction as to raise the valve member to a slightly more open position. In this manner, the fuel valve is positioned in accordance with the heating requirements of the space. If the space temperature finally rises to the maximum 72° for which the system, in this illustration, is adjusted, the valve is fully closed. However, under normal conditions, this maximum temperature is not reached on account of the constant reduction in heating rate. Likewise, the fuel valve only attains its fully open position if the space is subjected to excessive cooling, and normally continues to move back and forth within its modulating range.

While I have described my invention as applied to the control of a heating system, it is obviously not so limited, as changes within the scope of one skilled in the art may be made to effect control of other condition-changing systems, such as, for instance, a cooling, super-heat, humidifying, pressure, speed, or liquid-level system. For example, in a liquid-level system, a float could be provided with means for controlling the movement of bridge arm 42; the rate of liquid flow then being regulated in accordance with the variation of the liquid from a predetermined level by the liquid-pressure-motor-operated valve positioning means. In a speed control system, the bridge arm moving means could be associated with a governor.

I wish it to be understood that still other modifications may be made without departing from the spirit of my invention and that I intend therefore to be limited only by the scope of the appended claims.

I claim as my invention:

1. In combination: means for changing a condition; a member movable in opposite directions between limiting positions, and capable of assuming a plurality of other positions intermediate thereof, for varying the operation of said condition changing means; liquid pressure operated means, including an electrically operated pump, for moving said member in one of said directions; means biasing said member in the other of said directions; electrically operated valve means adapted, when unenergized, to relieve the liquid pressure applied to said moving means whereby the member is moved by said bias; means movable in response to change in said condition; an electrical bridge, the balance of which is influenced by the movement of said condition responsive means; and switching means, responsive to the balance condition of said bridge, and adapted when the same is balanced to effect energization of said relief valve; said switching means being adapted when the bridge is unbalanced in opposite senses to effect, respectively, energization and deenergization of both said relief valve and said pump.

2. In combination: means for changing a condition; a member movable in opposite directions between limiting positions, and capable of assuming a plurality of other positions intermediate thereof, for varying the operation of said condition changing means; liquid pressure operated means, including an electrically operated pump, for moving said member in one of said directions; means biasing said member in the other of said directions; electrically operated valve means adapted, when unenergized, to relieve the liquid pressure applied to said moving means whereby the member is moved by said bias; means movable in response to change in said condition; an electrical bridge, the balance of which is influenced by the movement of said condition responsive means; a three-position polarized relay connected to said bridge and responsive to the balance condition thereof; and switching means, controlled by said relay, and adapted in the neutral condition thereof to effect energization of said relief valve; said switching means being adapted when said relay is in opositely energized conditions to effect, respectively, energization and deenergization of both said relief valve and said pump.

3. In combination: means for changing a condition; a member movable in opposite directions between limiting positions, and capable of assuming a plurality of other positions intermediate thereof, for varying the operation of said condition changing means; liquid pressure operated means, including an electrically operated pump, for moving said member in one of said directions; means biasing said member in the other of said directions; electrically operated valve means adapted, when unenergized, to relieve the liquid pressure applied to said moving means whereby the member is moved by said bias; means movable in response to change in said condition; an electrical bridge, the balance of which is influenced by the movement of said condition responsive means; switching means, responsive to the balance condition of said bridge, and adapted when the same is balanced to effect energization of said relief valve; said switching means being adapted when the bridge is unbalanced in opposite senses to effect, respectively, energization and deenergization of both said relief valve and said pump; and means, moved in accordance with the movement of said movable member, for balancing said bridge in response to the effect of the actuation of said switching means.

4. In combination: means for changing a condition; a member movable in opposite directions between limiting positions, and capable of assuming a plurality of other positions intermediate thereof, for varying the operation of said condition changing means; liquid pressure operated means, including an electrically operated pump, for moving said member in one of said directions; means biasing said member in the other of said directions; electrically operated valve means adapted, when unenergized, to relieve the liquid pressure applied to said moving means whereby the member is moved by said bias; means movable in response to change in said condition; an electrical bridge, the balance of which is influenced by the movement of said condition responsive means; a three-position polarized relay connected to said bridge and responsive to the balance condition thereof; switching means, controlled by said relay, and adapted in the neutral condition thereof to effect energization of said relief valve; said switching means being adapted when said relay is in oppositely energized conditions to effect, respectively, energization and deenergization of both said relief valve and said pump; and means, moved in accordance with the movement of said movable member, for balancing said bridge in response to the effect of the actuation of said switching means.

5. In combination: means for changing the temperature of a space; a member movable in opposite directions between limiting positions, and capable of assuming a plurality of other positions intermediate thereof, for varying the operation of said temperature changing means; liquid pressure operated means, including an electrically operated pump, for moving said member in one of said directions; means biasing said member in the other of said directions; electrically operated valve means adapted, when unenergized, to relieve the liquid pressure applied to said moving means whereby the member is moved by said bias; means in said space and movable in response to changes in the temperature thereof; an electrical bridge, the balance of which is influenced by the movement of said temperature responsive means; and switching means, responsive to the balance condition of said bridge, and adapted when the same is balanced to effect energization of said relief valve; said switching means being adapted when the bridge is unbalanced in opposite senses to effect, respectively, energization and deenergization of both said relief valve and said pump.

6. In combination: means for changing the temperature of a space; a member movable in opposite directions between limiting positions, and capable of assuming a plurality of other positions intermediate thereof, for varying the operation of said temperature changing means; liquid pressure operated means, including an electrically operated pump, for moving said member in one of said directions; means biasing said member in the other of said directions; electrically operated valve means adapted, when unenergized, to relieve the liquid pressure applied to said moving means whereby the member is moved by said bias; means in said space and movable in response to changes in the temperature thereof; an electrical bridge, the balance of which is influenced by the movement of said temperature responsive means; a three-position polarized relay connected to said bridge and responsive to the balance condition thereof; switching means, controlled by said relay, and adapted in the neutral condition thereof to effect energization of said relief valve; said switching means being adapted when said relay is in oppositely energized conditions to effect, respectively, energization and deenergization of both said relief valve and said pump; and means, moved in accordance with the movement of said movable member, for balancing said bridge in response to the effect of the actuation of said switching means.

7. In combination: means for heating a space; a member movable in opposite directions between limiting positions, and capable of assuming a plurality of other positions intermediate thereof, for varying the operation of said heating means; liquid pressure operated means, including an electrically operated pump, for moving said member in such direction as to increase the temperature of the space; means biasing said member in an opposite direction; electrically operated valve means adapted, when unenergized, to relieve the liquid pressure applied to said moving means whereby the member is moved by said bias; means in said space and movable in response to changes in the temperature thereof; an electrical bridge, the balance of which is influenced by the movement of said temperature responsive means; a three-position polarized relay connected to said bridge and responsive to the balance condition thereof; switching means, controlled by said relay, and adapted in the neutral condition thereof to effect energization of said relief valve whereby said movable member is maintained in a position; said switching means being adapted when said relay is in oppositely energized conditions to effect, respectively energization and deenergization of both said relief valve and said pump, whereby the heating of the space is respectively increased and decreased; and means, moved in accordance with the movement of said movable member, for balancing said bridge in response to the result of the actuation of said switching means.

WILLIAM A. RAY.